United States Patent [19]
Roberts, Jr.

[11] Patent Number: 6,000,215
[45] Date of Patent: Dec. 14, 1999

[54] METHOD OF OPERATING A GAS TURBINE ENGINE

[75] Inventor: William C. Roberts, Jr., Palm City, Fla.

[73] Assignee: United Technologies Corporation, Hartford, Conn.

[21] Appl. No.: 08/996,792

[22] Filed: Dec. 23, 1997

[51] Int. Cl.$^6$ .............................. F02K 1/17; F02K 3/02
[52] U.S. Cl. ................................ 60/204; 60/235; 60/236
[58] Field of Search ............................ 60/204, 233, 235, 60/236, 238, 239

[56] References Cited

U.S. PATENT DOCUMENTS

| | | | |
|---|---|---|---|
| 4,159,625 | 7/1979 | Kerr | 60/238 |
| 4,294,069 | 10/1981 | Camp | 60/238 |
| 4,809,500 | 3/1989 | Roberts, Jr. | 60/235 |

*Primary Examiner*—Ted Kim
*Attorney, Agent, or Firm*—Christopher T. Hayes

[57] ABSTRACT

The present invention provides a method of maintaining fan airflow at 100% for throttle transients from 100% military power to 30% thereof by increasing exhaust nozzle area as the fuel flow the engine decreases until the exhaust nozzle reaches its fully open position. Subsequent reductions in fuel flow produce a commensurate reduction fan airflow.

8 Claims, 5 Drawing Sheets

METHOD OF OPERATING A GAS TURBINE ENGINE

TECHNICAL FIELD

This invention relates to aircraft engines of the turbine type of power plant and particularly to a method of controlling such power plants in fighter type aircraft.

BACKGROUND ART

This invention is particularly concerned with military aircraft as opposed to civilian or commercial aircraft and even more particularly to the class of aircraft that would fall in the fighter class. As is well known, fighter aircraft as presently perceived are designed for aerial combat. Because of the nature of its flight mission this class of aircraft typically undergoes rather violent maneuvers, calling for much manipulation of the engine power lever to change thrust of the engine so as to accelerate, decelerate, climb, dive, etc. at very severe conditions.

Many fighter engines are equipped with augmentors and during aerial combat the engine operates from maximum augmented power to 100% military power (augmentor off) to idle power. The invention disclosed herein relates to engine operation between 100% military ("mil") power and idle power, and does not affect augmented power or engine operation in the afterburning mode.

When the aircraft performs combat maneuvers the pilot will typically exercise power lever movements which result in engine speed, temperature, and airflow excursions. Under such maneuver excursions the rotor speeds of the fan and high pressure compressor rotors will vary from a maximum rotational speed at "military power" (100% thrust) to a substantially lower rotational speed called "cruise" (60% thrust) or an even lower speed called "idle" (0% thrust). While these rotor speeds and thrusts are varying during maneuver excursions, the variable geometry parts of the engine are also changing. Although the exhaust nozzle area remains constant, the fan and high compressor variable vane angles are changing with rotor speed.

The relationship between fuel flow and fan rotational speed at various exhaust nozzle areas for a gas turbine engine is shown in FIG. 1. N1C-RPM, the Y axis of the graph, is the fan speed (corrected for temperature, N1C) and main engine fuel flow is the X axis. The solid line identified by reference numeral E is the normal operating line of the engine. For each exhaust nozzle (jet) area line of the parameters shown in FIG. 1, the fan rotor speed and jet area increases in the direction denoted by the arrow. As those skilled in the art will readily appreciate, as fuel flow increases along the operating line, N1C-RPM increases along a constant exhaust nozzle area operating line, X to O.

A typical method of controlling a gas turbine engine results in an engine operating line as shown in FIG. 2 on a fan map, which shows a typical engine operating line E plotted against percent fan design pressure ratio (ordinate) and percent fan design airflow (abscissa) for given lines of corrected fan speed, N1C. For typical engine transients between mil power, 60% mil and idle, the schedule would operate the engine along the operating line E from point G to H (60% mil) to M (idle). The operating line E is spaced from the stall line J and the difference between the stall line J and the operating line E for any given corrected fan speed defines the stall margin K. On a percentage basis, stall margin K is equal to (% Fan Pressure Ratio at Stall—% Fan Pressure Ratio at Operating Condition)/(% Fan Pressure Ratio at Operating Condition). The larger the stall margin the better the engine's stability, particularly during transients. As FIG. 2 shows, a throttle transient from point G to point H results in a fan airflow excursion in excess of 10%. Unfortunately, since the engine inlet is normally designed to capture enough air to provide the correct airflow through the engine at military power, reducing fan airflow below 100% causes air at the inlet to "spill" out around the engine, and the magnitude of this spillage air increases as the fan airflow decreases. This changing spillage air affects the airflow field over and under the aircraft wings which causes aircraft buffeting. Aircraft buffeting is distracting to a pilot during combat maneuvers, and causes cracking and breakage of the brackets and rails which support the weapons on the aircraft.

What is needed is a method of operating a gas turbine engine at part power below 100% mil power which does not produce the type of inlet spillage air for thrust changes below military power.

SUMMARY OF THE INVENTION

It is therefore an object of the present invention to provide a method of operating a gas turbine engine which does not produce the type of inlet spillage air for thrust changes from military power to part power (i.e. 30% of mil power) which are inherent in the gas turbine engines of the prior art.

Another object of the present invention is to increase the low cycle fatigue life of rotating parts as compared to gas turbine engines of the prior art.

Another object of the present invention is to increase the engine stability, operability and performance as compared to gas turbine engines of the prior art.

Another object of the present invention is to reduce engine thrust transient time as compared to gas turbine engines of the prior art.

Accordingly the present invention provides a method of maintaining fan airflow at 100% for throttle transients from 100% military power to 30% thereof by increasing exhaust nozzle area as the fuel flow the engine decreases until the exhaust nozzle reaches its fully open position. Subsequent reductions in fuel flow produce a commensurate reduction fan airflow and fan speed, N1C.

The foregoing and other features and advantages of the present invention will become more apparent from the following description and accompanying drawings.

BEST MODE FOR CARRYING OUT THE INVENTION

This invention is intended to be utilized on engines where not only the flow of fuel to the engine's burner is regulated, but also where the area of the exhaust nozzle is varied during thrust transients to achieve the benefits enumerated above. The method of the present invention is intended to be used on engines of the twin-spool axial flow type operable between a predetermined idle thrust and a predetermined mil power thrust. (The engine also has the capability to operate in the augmented (afterburning) mode but this operation is not affected by the present invention.) As is typical in these configurations, the first spool comprises a fan and sometimes a low pressure compressor section driven by a low pressure turbine section, and the second spool comprises a high pressure compressor section driven by a high pressure turbine section. A burner, typically of the annular type, is disposed between the high pressure compressor section and the high pressure turbine section and serves to heat and accelerate the engine's working medium in order to energize the gases sufficiently so as to power the turbines and generate thrust. (The symbol $P_3$ indicates burner pressure).

Figure 3:
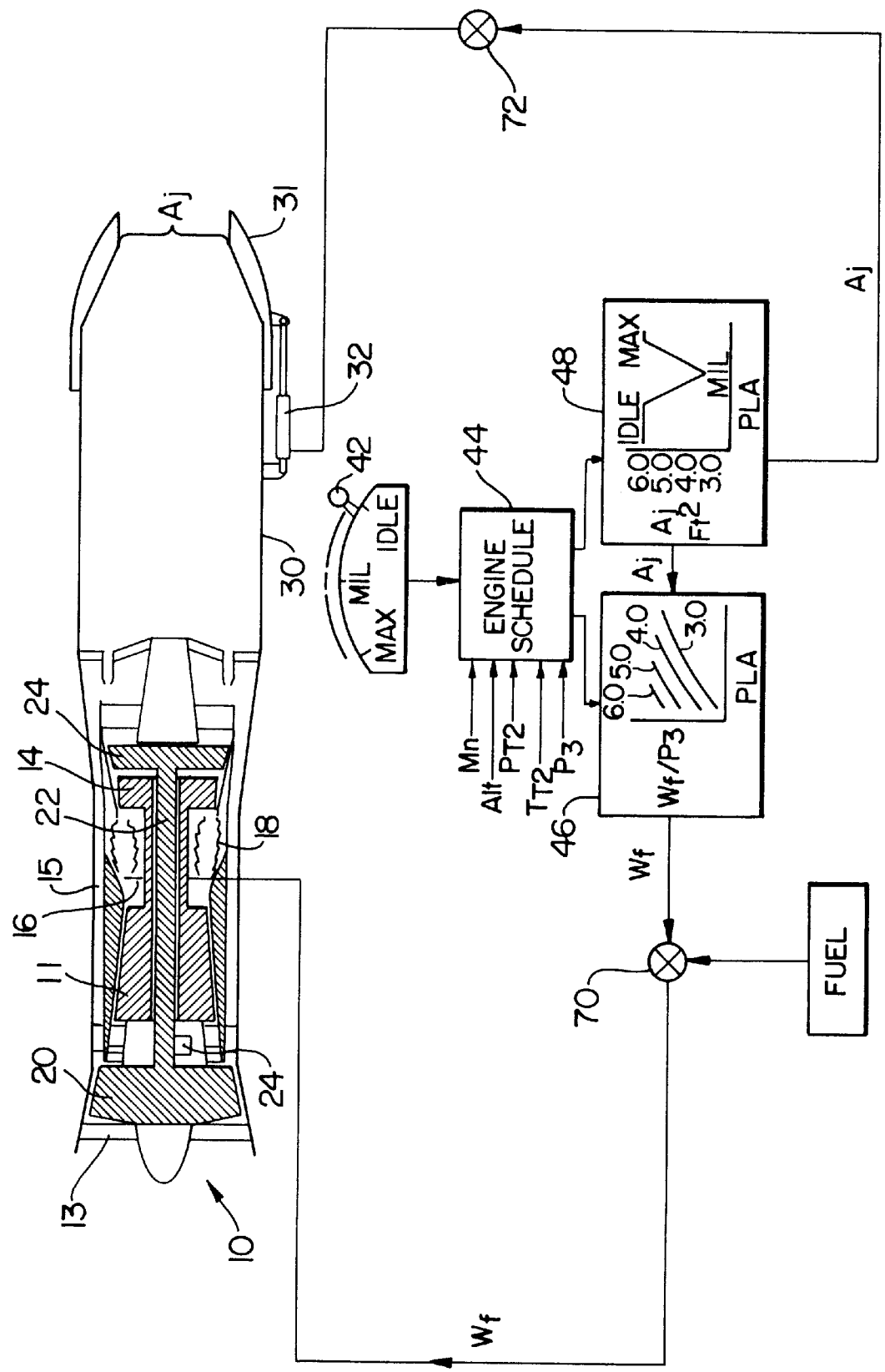
FIG. 3 is a plan view representing a typical gas turbine power plant and a schematic in block diagram illustrating control and scheduling of fighter type jet engines consistent with this invention.

As is shown schematically in FIG. 3, the gas turbine power plant generally indicated by reference numeral 10 comprises an engine inlet 13, a gas generator section including a high pressure compressor section 11 in spaced relation to a high pressure turbine section 14, and the high pressure compressor section 11 and the high pressure turbine section 14 are interconnected by a high speed shaft 16. A gas generator burner 18 is disposed therebetween and serves to combust fuel to energize the engine's working medium. The fan and low pressure compressor section 20 is in spaced relation to the low pressure turbine section 24, and the fan and low pressure compressor section 20 is connected to the low pressure turbine section 24 by a low speed shaft 22. A speed sensor 74 is located proximate to the low speed 22 shaft for determining the rotational speed of the low speed shaft 22. The high pressure compressor section 11 and the high pressure turbine section 14 are disposed between the low pressure compressor section 21 and the low pressure turbine section 24. The high pressure spool and low pressure spool are located between the inlet 13 and a variable area exhaust nozzle 31. The low pressure spool and the high pressure spool are not mechanically connected to each other but rotate independently.

The engine also includes a bypass duct 15 an augmentor 30 that receives the engine's working medium discharging from the low turbine section. Ultimately, the engine's working medium is discharged from the engine through the variable area exhaust nozzle (Aj). A suitable actuator 32 serves to position the variable surfaces of the exhaust nozzle so as to control the area of the discharge opening which is adjusted as a function of the engine's operating schedule. The fan 20 draws air through the inlet 13 and supplies a first portion of the air to the bypass duct 15 and a second portion of the air to the high pressure compressor section 11. As shown in FIG. 3, the bypass duct 1.5 is located radially outward from the high pressure compressor section 11, the burner 18, and the high pressure turbine section 14 and serves to bypass a portion of air around the high pressure compressor section 11, the burner 18, and the high pressure turbine section 14, and directly to the augmentor section 30.

Fuel flow to the burner 18 is controlled by a fuel control valve 70 that selectively varies the amount of fuel flowing to the burner 18. The area of the exhaust nozzle 31 is controlled by an exhaust nozzle control 72 that selectively varies the exhaust area of the exhaust nozzle 31 between a predetermined minimum area and a predetermined maximum area. In modem day aircraft an electronic controller is generally employed which monitors a plurality of engine operating parameters and calculate values to adjust the fuel flow and engine's variable geometry to achieve optimum engine operation. This invention contemplates the existence of these schedules whether they be through an electronic, hydraulic or hydro-mechanical controls.

A typical scheduling scheme is shown schematically in FIG. 3 in block diagram. It is to be understood, however, and will be appreciated by one skilled in the art, that once the concept is understood, the implementation of this invention can be easily accommodated by changes made to existing scheduling mechanism. In a digital type control, for example, a suitable chip can be designed and integrated into the existing computer package.

As shown in FIG. 3, the engine schedulng control mentioned above monitors a plurality of engine operating parameters, such as the rotational speed of the low spool (N1), discharge pressure (P3) of the high compressor section, engine inlet pressure (P2), Mach Number (Mn), Altitude (Alt) and others and computes values to operate the engine automatically to achieve optimum engine operation, including meeting thrust requirements, while avoiding engine anomalies such as surge, overtemperature and the like. As noted, the engine scheduling controllers 44, 46, 48 serve to produce at least two output signals. One output is the gas generator fuel flow (Wf) which is suitably calculated in the function generator identified by reference numeral 46. The other is the area of the exhaust nozzle (Aj) which is calculated in the function generator indicated by reference numeral 48.

In accordance with the method of the present invention, it is the ideal goal to hold N1C or the scheduled low rotor speed, from 100% military power to as low in power or thrust as is possible within the physical geometry limits of the engine. In this example case it was possible to hold constant N1C at the schedule value (f(TT2)) down to 30% of mil power thrust at which point a maximum jet area limit was encountered. From this point on down in thrust to idle, 0% mil thrust, the fan operating point moves along line F with decreasing fan rotor speed until it is encountered (FIG. 4) at flight idle which is 0% of mil power thrust. This is the normal operating path of the engine as described by this invention for thrust transients during combat anywhere within the engine flight envelope.

There is another part of the present invention that deals with steady state engine performance during the cruise out and cruise back legs of the combat mission. Here the PLA is stationary or moved only + or − a few degrees to hold constant aircraft speed during cruise mission legs. From the previous discussion on transient engine operation and the engine operating line on the fan map, FIG. 4, the jet area at the beginning of cruise is in an open position, more open than optimum for steady state cruise or loiter. There is logic in the control 48, to the effect that if the engine power lever (PLA) is stationary or moves only + or − a few degrees for a period of one minute, for example, the aircraft is not in combat but is in steady state cruise. When this is the case the jet area should close from the more open jet area position (e.g. 6.0 ft$^2$) to a more closed position (e.g. 3.0 ft$^2$) where the best cruise thrust specific field consumption occurs. The jet area stays in this more closed position until the PLA is moved outside a floating PLA dead band allowed for cruise only, example + or −5 degrees around any null PLA position. If the PLA floating dead band is violated, the engine returns to its normal engine operating line H' or F on FIG. 4. At this point, those skilled in the art will readily appreciate how the engine operates during transient operation, shown in FIG. 4, the exception to the normal operating line shown in FIG. 4, that being cruise, how the control shifts from normal operation to cruise, which is the exception, and how the control shifts from cruise back to normal operation.

Figure 4:
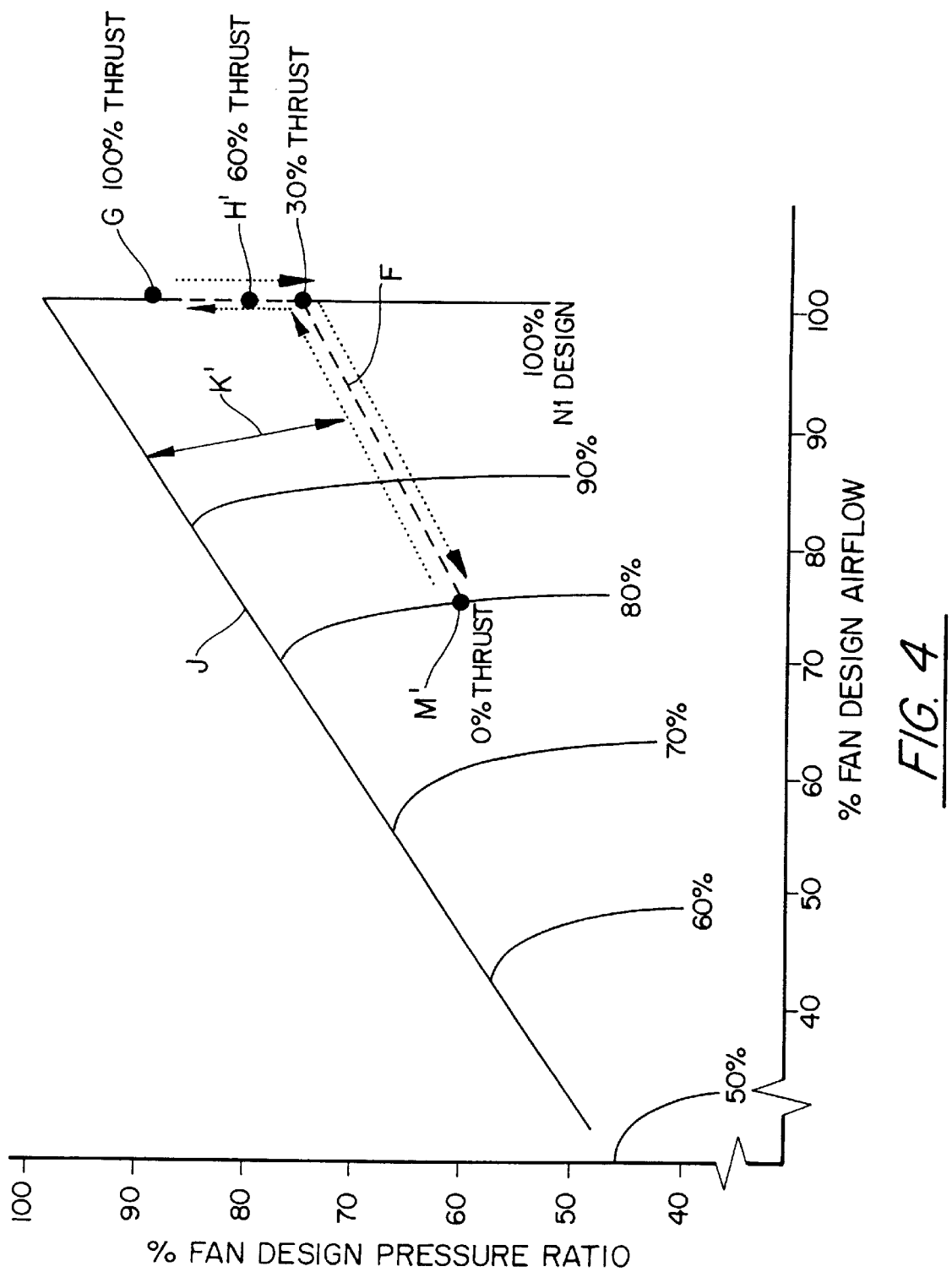
FIG. 4 is a graph showing the effect of the method of the present invention on the engine operating point on the fan map of a typical gas turbine engine.

There are four clear advantages to controlling an engine in the manner shown in FIG. 4, relative to prior art. First, thrust response time from 100% mil power to 30% mil power or 30% to 100% area is instantaneous because no fan rotor speed change is required. Thrust response time from 100% mil to 30% mil thrust to idle thrust is cut by at least 50% because the fan rotor speed and fan airflow changes required to achieve these trust changes are cut by at least 50% relative to engine controls of the prior art. The same is true for thrust transients in the opposite direction.

Second, the aircraft inlet spillage air drag is eliminated on thrust transients between 100% mil power and 30% mil power because there is no fan rotor speed change and no airflow change. The spillage drag is cut by at least 50% for thrust transients between 100% mil thrust and 30% mil thrust and idle thrust because the fan rotor speed change and fan airflow change have been cut by at least 50% relative to engine controls of the prior art. The same is true for thrust transients from part mil power to 100% mil power. These first two advantages make the engine more user friendly and fall into the category of "quality" engine improvements.

Figure 1:
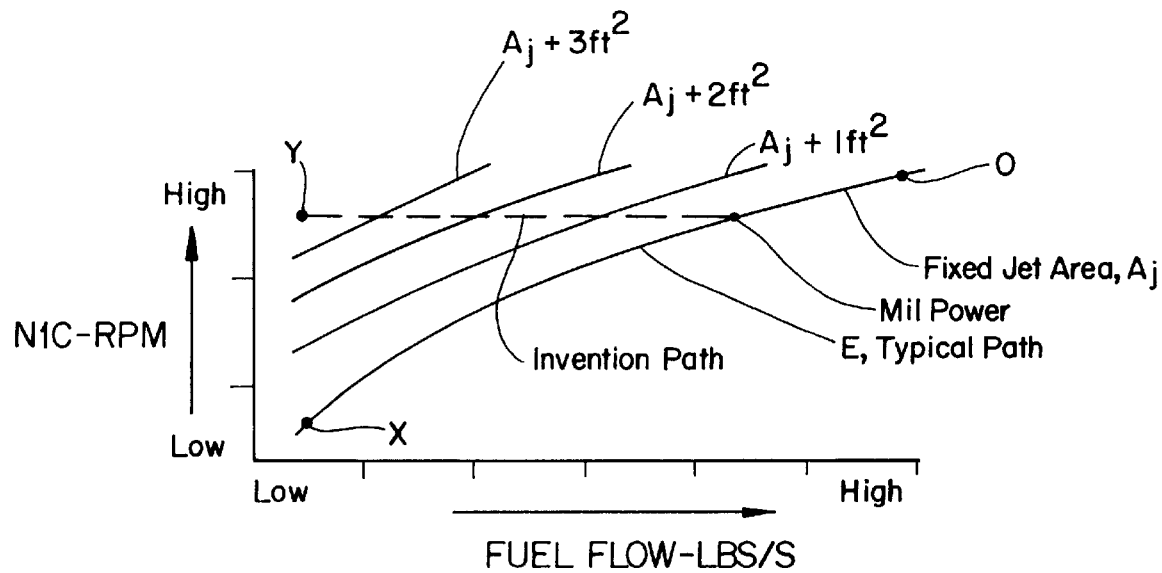
FIG. 1 is a graph showing the relationship of fuel flow, fan speed and exhaust nozzle area for the gas turbine engine.
Figure 2:
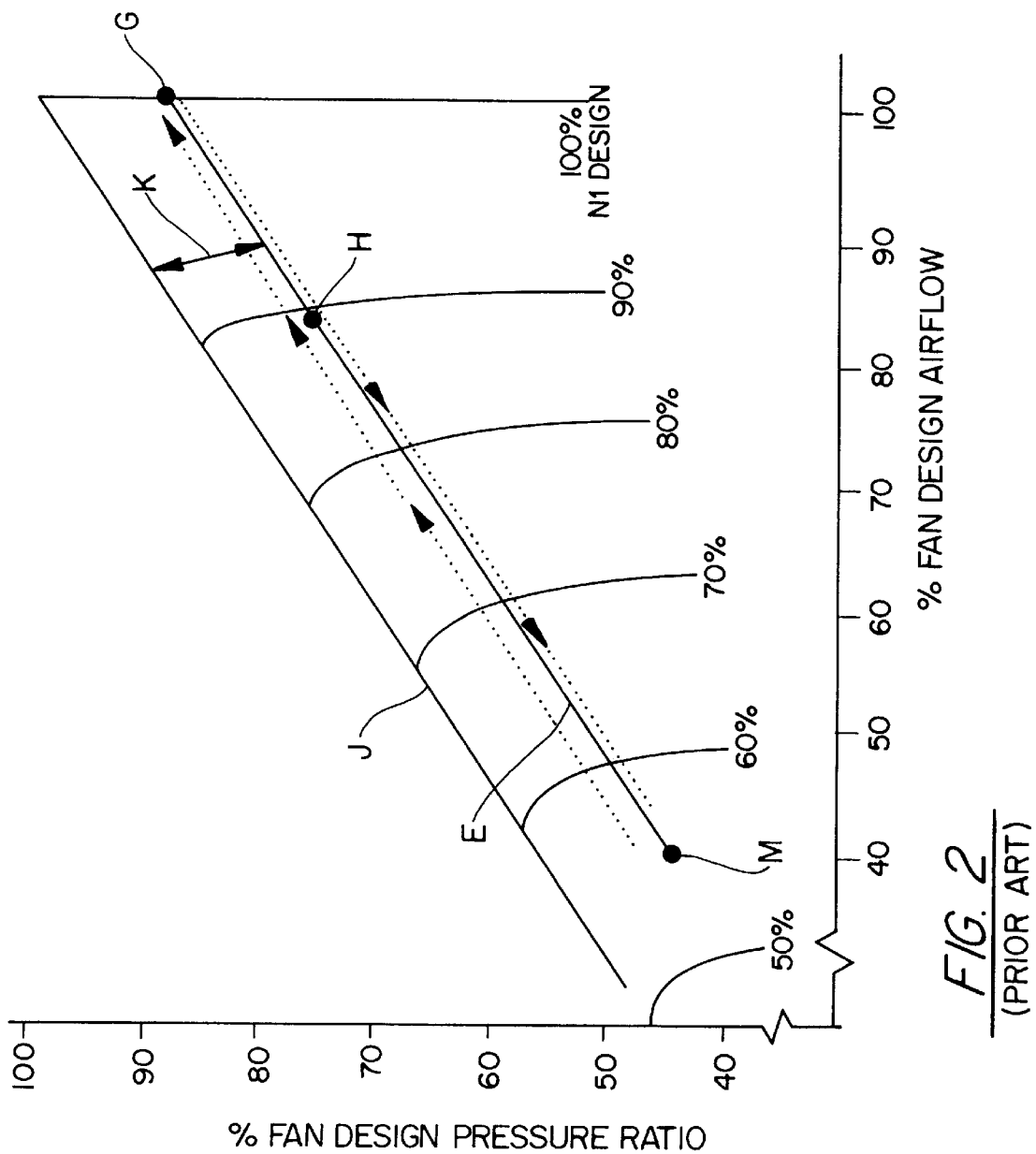
FIG. 2 is a graph showing a fan map of a typical gas turbine engine.

Third, for military engines in fighter aircraft controlled by engine controls of the prior art the maximum fan rotor speed excursion is from 100% N1C down to 55%, as shown in FIG. 2. With the present invention, the maximum fan rotor speed excursion is from 100% N1C down to 80% N1C. As is clearly shown in FIG. 2, the in flight maximum operating range of the low rotor RPM has been reduced from 45% to 20%. This includes the fan and low turbine. Therefore, new engines designed to incorporate the present invention can utilize engine components designed to higher levels of peak efficiency because the off-design operating speed range has been cut in half. Also major metal components of the fan and low turbine (e.g. disks and cases) experience a much lower strain range when operated with the present invention as compared to the prior art. The significantly reduced strain range means that fan and low turbine disks and cases could be designed 10% to 20% lighter and still achieve engine life requirements.

Fourth, the same logic process holds true for the high spool, high compressor and high turbine, because the operating rotor speed excursions are again cut by at least 50%. The low cycle fatigue impact on the disks and cases of these high spool components would allow 10% to 20% of their weight to be eliminated, and these parts would still achieve engine life requirements. Also on the high spool two new very important engine design parameters step into the picture. These are compressor discharge temperature, T3, and turbine inlet temperature, T4. In and during the thrust decel from mil power to idle, T3 cools significantly (this is referred to as a "quench"). This quenching of the compressor exit case and exit rotor causes cooling and shrinkage in diameter of the compressor case and rear compressor disks.

The compressor case has a much larger surface area to mass ratio than does a rear compressor disk. This causes the compressor case to cool much faster than a compressor disk and reduce in diameter much faster than the compressor disk. A mechanical interference can occur between the rear compressor blades and rear compressor case which can result in rear compressor blade tip clearance "rub-out". The result of rub-out is a loss in compressor efficiency and compressor stall margin. The prime driver in rear compressor case clearance close down is T3, and specifically the change in T3 from mil power to idle power. The change in T3 from mil power to idle power with the present invention is 35% less than with prior art engine controls. Therefore the clearance close down is 35% less at the rear of the compressor. The rear compressor case to blade tip clearance close down sets the rear compressor build clearances. With a 35% reduction in the rear compressor clearance close down, the compressor can now be built with tighter build clearances, (i.e. 30% to 35% tighter). This results in a high compressor with improved compressor stall margin and a higher level of compressor efficiency. Since, with the present invention, there is no rub-out in even the most severe T3 excursion during a transient, the compressor holds its high efficiency operating level over the engine's entire life.

The situation is similar for the high turbine. The idle T4 during a rapid rust transient is significantly higher (+300 degrees F.) with the present invention as compared to the same engine with a control of the prior art at the same idle thrust. This +300 degrees F. higher transient idle T4 is a 30% reduction in the change in T4 from mil power to idle power during a "bodie" (a mil-to-idle-to-mil power transient). Again this low T4 idle quench in an engine controlled by the prior art causes the turbine case to shrink in diameter faster than the turbine disk or disks, and a high turbine tip clearance rub-out can occur. This results in loss in both high turbine efficiency, and plugging of some turbine cooling passages in turbine blade tips and shrouds which, in turn, leads to rapid deterioration of these parts because of insufficient cooling. The present invention reduces the change in T4 (i.e. turbine quench) during a bodie by 30% which, in turn, reduces the blade-to-case clearance close down by 30%. With this significantly reduced change in T4 during a rapid thrust transient, the high turbine can be built with tighter blade tip-to-shroud clearances, improving the high turbine efficiency operating level over the engine's entire life.

The new control of the present invention also has a major positive effect on engine performance retention. The prime driver on engine performance deterioration with accumulated run time is loss in component efficiency due to blade tip clearance rub-out that occurs on major thrust transients. The new control of the present invention eliminates blade tip rubs as described previously resulting in the maintaining of engine component efficiency levels with run time and normal operation, which greatly reduces the loss in overall engine performance with accumulated run time, as shown in FIG. 5.

Figure 5:
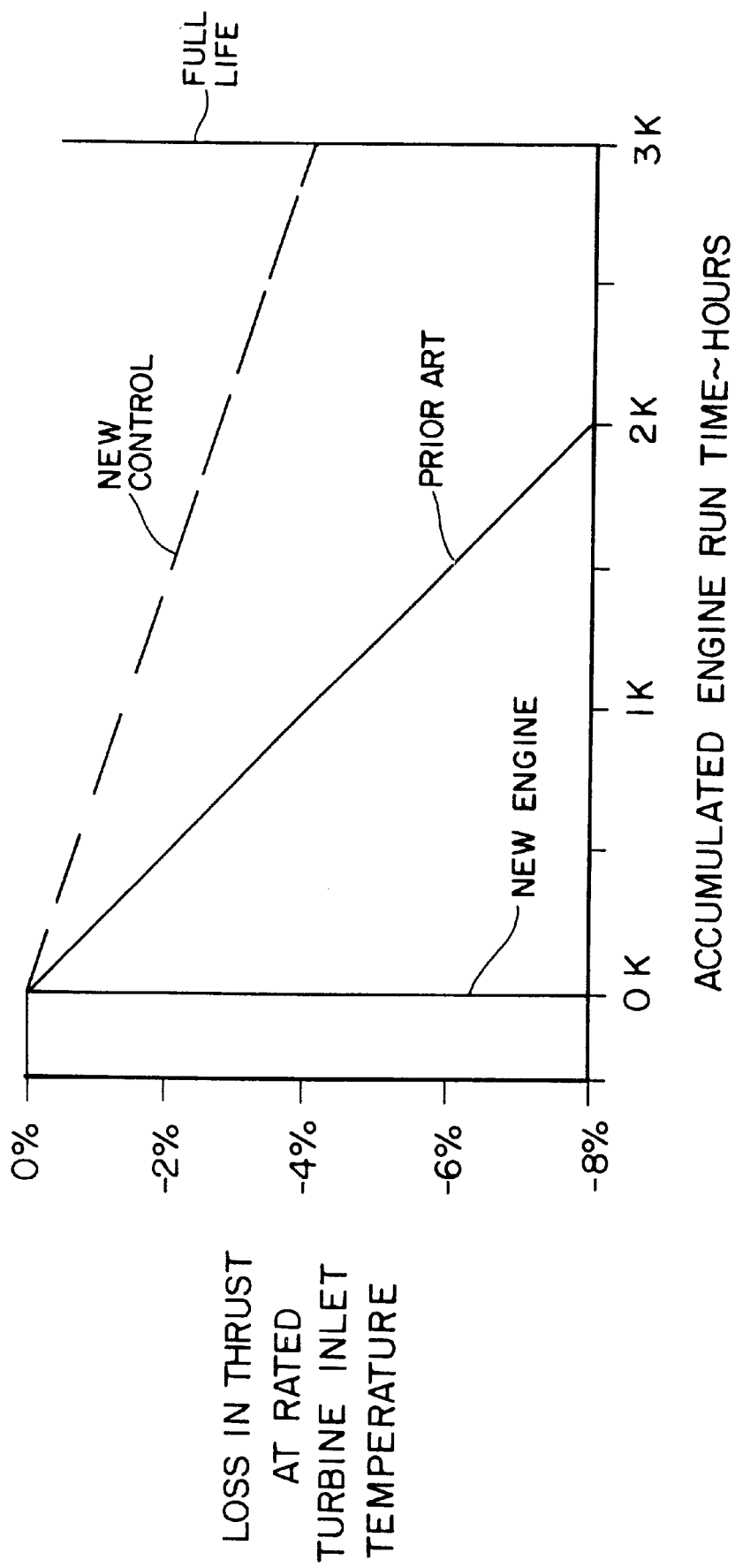
FIG. 5 is a graph comparing the loss in thrust of the method of the present invention with the prior art.

In an effort to offset the loss in engine performance (thrust) shown in FIG. 5, the turbine inlet temperature T4 of the engine is raised. Running the engine at an elevated T4 fatigues the turbine parts at an accelerated rate and reduces the useful life of these parts. In addition, operating the engine at an elevated T4 burns more fuel. An engine using the present invention and running with higher component efficiency levels is able to run at reduced levels of T4 and hot section parts last longer, and achieve full design life. An engine incorporating the present invention also burns less fuel and the aircraft has greater range.

In summary the benefits, the claims are: (1) Faster trust transients, (2) Elimination/reduction of inlet spillage and aircraft buffeting, (3) Tighter engine clearances with no rub-out, which leads to a stall-free engine, higher components efficiency levels, greatly improved engine performance retention, lower operating turbine temperatures, greater aircraft range (reduced TSFC), and longer hot section part life.

Although this invention has been shown and described with respect to detailed embodiments thereof, it will be understood by those skilled in the art that various changes in form and detail thereof may be made without departing from the spirit and scope of the claimed invention.

I claim:

1. A method of operating a gas turbine engine for aircraft propulsion, said method comprising providing a gas turbine engine operable between a predetermined idle thrust and a predetermined maximum thrust and having an engine inlet, a variable area exhaust nozzle, a bypass duct, a burner, first and second shafts located between said inlet and said nozzle, said second shaft including a high pressure compressor section in spaced relation to a high pressure turbine section, said first shaft including a fan and low pressure turbine section, said fan and low pressure turbine section for drawing air through said inlet and supplying a first portion of said air to said bypass duct and a second portion of said air to said high pressure compressor section, said fan and low pressure turbine section in spaced relation to said low pressure turbine section, said high pressure compressor section and said high pressure turbine section located between said fan and low pressure turbine section said burner located between said high pressure compressor section and said high pressure turbine section, said bypass duct located radially outward from said high pressure compressor section and said burner and said high pressure turbine section for bypassing said first portion of air around said high pressure compressor section, said burner, and said high pressure turbine section and directly to said exhaust nozzle, a fuel control for selectively varying the amount of fuel flowing to the burner, an exhaust nozzle control for selectively varying the exhaust area of the exhaust nozzle between a predetermined minimum area and a predetermined maximum area, means for determining the rotational speed of said first shaft;

determining fan airflow as a function of fan rotational speed at a given engine operating condition;

determining a maximum desired rotational speed of said first shaft at said given engine operating condition;

determining the minimum fuel flow to the burner necessary to achieve said maximum desired rotational speed of said first shaft when said exhaust nozzle area is equal to said predetermined maximum area;

maintaining said exhaust nozzle area at said predetermined maximum area for all fuel flows to the burner that are no greater than said minimum fuel flow to the burner;

maintaining said rotational speed of said first shaft at said maximum desired rotational speed for all fuel flows to the burner that are greater than said minimum fuel flow to the burner.

2. The method of claim 1 wherein the step of maintaining said rotational speed of said first shaft at said maximum desired rotational speed includes reducing the exhaust nozzle area as said fuel flow to the burner increases from said minimum fuel flow.

3. The method of claim 2 wherein said given engine operating condition is a thrust equal to said predetermined maximum thrust.

4. The method of claim 2 wherein said given engine operating condition is a thrust less than said predetermined maximum thrust.

5. The method of claim 1 wherein the step of maintaining said exhaust nozzle area at said predetermined maximum area is preceded by the step of:

determining an increase in rotational speed of the first shaft for a given increase in fuel flow to the burner, and determining a given decrease in exhaust nozzle area necessary to offset the increase in rotational speed of the first shaft resulting from said given increase in said fuel flow to the burner.

6. The method of claim 5 wherein the step of maintaining said rotational speed of said first shaft at said maximum desired rotational speed includes simultaneously increasing said fuel flow to the burner by an amount equal to said given increase and decreasing said exhaust nozzle area by an amount equal to said given decrease.

7. The method of claim 6 wherein said given engine operating condition is a thrust equal to said predetermined maximum thrust.

8. The method of claim 6 wherein said given engine operating condition is a thrust less than said predetermined maximum thrust.

* * * * *